United States Patent [19]

McClain

[11] 4,200,708

[45] Apr. 29, 1980

[54] PROCESS FOR SEQUENTIALLY DISPERSING AND SAPONIFYING ETHYLENE-VINYL ACETATE COPOLYMER

[75] Inventor: Dorothee M. McClain, Cincinnati, Ohio

[73] Assignee: National Distillers and Chemical Corporation, New York, N.Y.

[21] Appl. No.: 934,648

[22] Filed: Aug. 17, 1978

[51] Int. Cl.[2] ............................ C08F 6/24; C08F 8/12

[52] U.S. Cl. .................................. 525/62; 260/23 H; 260/29.6 PM

[58] Field of Search ........................ 526/10; 260/23 H

[56] References Cited

U.S. PATENT DOCUMENTS

| | | | |
|---|---|---|---|
| 4,100,335 | 7/1978 | McClain et al. | 526/10 |
| 4,104,453 | 8/1978 | Broering et al. | 526/10 |

OTHER PUBLICATIONS

Journal of Applied Pol. Sci., 12, pp. 47-58 (1968).

*Primary Examiner*—Stanford M. Levin

*Attorney, Agent, or Firm*—Kenneth D. Tremain

[57] ABSTRACT

Finely divided saponified ethylene-vinyl acetate copolymer particles are prepared by forming an aqueous dispersion of the copolymer without effecting any appreciable saponification of the dispersed copolymer and thereafter saponifying the dispersed copolymer to the extent desired.

17 Claims, No Drawings

PROCESS FOR SEQUENTIALLY DISPERSING AND SAPONIFYING ETHYLENE-VINYL ACETATE COPOLYMER

BACKGROUND OF THE INVENTION

1. Field of the Invention

This invention relates to processes for preparing saponified ethylene-vinyl acetate copolymer, and more particularly, to such processes in which saponification is carried out upon finely divided ethylene-vinyl acetate copolymer particles dispersed in an aqueous medium.

2. Description of the Prior Art

It is well-known that high molecular weight thermoplastic resins, for example, polyethylene and ethylene copolymers, can be converted to dispersions of spherically shaped particles which are substantially devoid of particles greater than 25 microns in diameter and in which the number average particle diameter is less than about 10 microns. Thus, McClain U.S. Pat. No. 3,422,049 teaches that such dispersions of finely divided particles can readily be prepared by agitating the molten resin in admixture with water at elevated temperatures and at autogenous pressure, in the presence of certain dispersing agents which are particular block copolymers of ethylene oxide and propylene oxide. The non-agglomerated spherical particles can be recovered as powders by cooling the dispersions below the fusion point of the resin and collecting the suspended material by filtration or centrifugation.

U.S. Pat. No. 3,418,265 further teaches that the particle size of such thermoplastic resin dispersions can be reduced still further, to the sub-micron level, while retaining the unique spherical particle shape by including in the disperion process a volatile, inert, water-insoluble organic liquid that is soluble in the thermoplastic resin in an amount between 0.5 and 20 parts per 100 parts of the resin, whereupon stable, aqueous film-forming latices of high molecular weight polyethylene are formed. Such dispersions can also be formed by including a liquid vinyl monomer such as styrene in the dispersion process.

Although the foregoing dispersion procedures are conveniently operated as batch processes, it is also known to produce such finely divided powders in a sequential, continuous dispersion process. See, e.g., U.S. Pat. No. 3,432,483.

U.S. Pat. No. 3,586,654 teaches that it is further possible to conduct the dispersion process in such a way that the polymer particles can be further transformed into spherical particles of controlled average size and size distributions which are the same, larger or smaller than the starting particles. If desired, the dispersion process can be modified in such a manner as to produce spherical foamed particles (U.S. Pat. No. 3,472,801), or to incorporate within the particles certain colorants (U.S. Pat. No. 3,449,291) and pigments (U.S. Pat. No. 3,674,736).

The fine powders are, by virtue of their small particle size, narrow particle size range, and spherical particle shape, unique states of matter which cannot readily be prepared by other conventional processes known in the art. The advantages and utility of such fine powders has been described in many of the aforesaid patent disclosures. In addition, it has been found that various substrates can be coated by applying the above described dispersions of polyolefin fine powders in an inert carrier, heating to evaporate the carrier, and fusing the polyolefin to the substrate (U.S. Pat. No. 3,432,339). Further, U.S. Pat. No. 3,669,922 teaches a process for preparing colored polymer powders having controlled charge and printing characteristics of value as toners in electrostatic printing.

The hydrolysis of ethylene polymers containing hydrolyzable copolymerized units, for example, vinyl acetate units, is also known in the art. Usually, the hydrolysis of such polymers is accomplished by the process of alcoholysis or transesterification in an alcoholic medium in the presence of an acid or basic catalyst, whereby the acetic ester of the alcohol employed is recovered as a by-product. Solution alcoholysis processes, i.e., in which the reaction is carried out in a mixed solvent of an aromatic hydrocarbon and lower primary alcohol, require the use of large volumes of solvent and larger reactors or kettles. The finished product must be recovered from solution and washed with additional alcohol. The time required to dissolve the resin before hydrolysis is long and the recovery procedure is also time consuming. In addition, the solvent-alcohol mixtures must be separated and recycled for re-use. Solvent losses are incurred which are undesirable from the view point of air pollution as well as for economic reasons. The inherent fire hazard in any process involving organic solvents is a further disadvantage of solution alcoholysis and, additionally, solvent shortages can also present problems.

A different process in which the ethylene-vinyl acetate copolymer in the form of pellets is hydrolyzed by alcoholysis in the swollen solid phase, in a substantially similar alcoholysis media, is described in U.S. Pat. No. 3,510,463. Pressure alcoholysis in the presence of sodium hydroxide in hexane-methanol and methanol alone at temperatures up to 230° C. has also been disclosed. (Japan. 70 33,065, Oct. 4, 1970; Chem Abstrs. 74, 32375v and Japan 70 33,066; Chem. Abstrs. 74, 54620y.)

Less commonly, the hydrolysis of ethylene-vinyl acetate copolymer is accomplished by the process of saponification, for example, in an aqueous emulsion where at least a stoichiometric amount of a strong base such as sodium or potassium hydroxide is required for the hydrolysis of a given number of moles of combined vinyl acetate units in the copolymer. See, e.g., U.S. Pat. No. 2,467,774. In general, however, saponification of ethylene-vinyl acetate copolymers is a slow process at ambient temperatures. Thus, Davies and Reynolds, J. Applied Polymer Sci. 12, No. 1, 47 (1968), have reported that at 25° C., 24 hours is required to effect an 18.1% saponification of an ethylene-vinyl acetate copolymer containing 50.8 weight percent vinyl acetate.

German Democratic Republic (DDR) Patent No. 88,404, describes a process for simultaneously dispersing and saponifying EVA copolymers employing sodium hydroxide or potassium hydroxide as the saponification agent and an alkyl sulfonate, an acyl derivative of N-methyltaurine, a higher fatty acid soap, an alkaryl sulfonate or a nonionic surface-active agent derived from ethylene oxide as the dispersion agent. The process described involves saponifying EVA copolymers at elevated temperature and pressure including, as the final step, discharging the reaction mixture at the operating temperature and pressure directly into a quench vessel at atmospheric or subatmospheric pressure. The quench vessel contains water that is stirred during the discharge operation and the rate of discharge of the reaction mixture is regulated by means of a needle valve. Thus, the sudden release of the reaction mixture causing a portion of the reaction medium to vaporize apparently results in formation of the dispersion due to the atomizing effect of the needle valve. This patent also discloses the optional use of dispersants, but it is apparent from the data provided that such dispersants have only a secondary effect, the primary determinant of dispersion being the discharge of the hot reaction mixture to the quenching bath. From the particle size distribution data provided in the disclosure, it is clear that the presence of dispersing agent seems to favor smaller particles, but is not absolutely essential since comparable dispersions are obtained when dispersing agents are not present in the reaction mixture. There is no indication that a dispersion of the polymer occurs in the reaction mixture prior to discharge when dispersing agents are present but the data provided shows that, on discharge, a dispersion is produced in the presence or absence of dispersing agent. Attempts to obtain dispersions of saponified EVA using N-oleoylsarcosinate as dispersing agent by merely cooling the reaction mixture without the described discharge step of DDR Pat. No. 88,404 have not produced dispersions. Similarly, when arylsulfonate dispersants are employed in lieu of the sarcosinate, no dispersions are obtained when the reaction mixture is cooled. Thus, it must be concluded that dispersion only occurs on discharge. The dispersed product obtained by the method of DDR Pat. No. 88,404 is of fairly large particle size, the heavy majority of the particles being of diameters greater than 0.125 mm, i.e., usually over 80% of the dispersed particles. In addition, the product is composed of irregular particles, with no spherical particles being observed.

The aforedescribed disadvantages of the process of DDR Pat. No. 88,404 have been largely overcome by the simultaneous dispersion and saponification process of McClain copending patent application Ser. No. 824,934 filed July 15, 1977 wherein EVA copoymer is dispersed and at the same time saponified in an aqueous dispersion medium containing an alkali metal soap together with an alkali metal hydroxide in an amount sufficient to saponify the copolymer to a predetermined degree. In addition to its relative simplicity, this process consistently provides saponified EVA copolymers in which the majority of particles is less than 250 microns, and the process can be readily operated so as to provide substantially spherical particles. However, using this process it is ordinarily difficult to achieve a particle size distribution of saponified EVA which will fall within a pre-set range without at least some preliminary, albeit simple, testing since saponification takes place at the same time the dispersion is being formed. Accordingly, there has heretofore existed a need for a simple and convenient process for obtaining saponified EVA particles, desirably spheroid in shape, which will predictably fall within a given range of particle size.

SUMMARY OF THE INVENTION

It has now been discovered that if instead of simultaneously carrying out the steps of dispersing and saponifying EVA copolymer as in the process of copending patent application Ser. No. 824,934 (now, U.S. Pat. No. 4,151,134), supra, these steps are carried out sequentially, it is considerably easier to obtain a particle size distribution which comes within the predetermined range set by the operator.

Broadly stated, the invention herein provides a process for obtaining finely divided saponified EVA copolymer particles which comprises the sequential steps of:

(a) dispersing the copolymer in an aqueous dispersion medium containing a dispersing agent for EVA copolymer under such conditions of time and/or temperature that no appreciable saponification of the dispersed copolymer can occur; and, (b) saponifying the dispersed copolymer employing a strong base as the saponifying agent under such conditions of time and/or temperature that saponification up to the desired extent can occur.

The term "dispersing agent" as it applies to the EVA copolymer substrates includes any of the non-ionic, anionic, cationic and amphoteric surface active agents which by themselves or in combination with other surface active agents and/or other materials as hereinafter more fully disclosed effect the dispersion of EVA copolymer in water at elevated temperature.

Although the present invention is not restricted to the production of spherical particles, and for some purposes spherical particles are not necessary or advantageous, it is nevertheless true that spherical particle shape is often of substantial importance in the commercial applications of the present products, contributing superior fluidization characteristics, shorter melting time, and improved dispersability to pulverulent compositions in which they are used. Thus, the spherical shaped particles are superior in powder form for static or fluidized dip coating, spraying, dusting and flame spraying applications as well as for preparing relatively stable dispersions in water or other liquids for use in roller, dip or spray coating.

DESCRIPTION OF THE PREFERRING EMBODIMENTS

The EVA copolymers employed in the practice of this invention can be prepared by any suitable polymerization process. Although the copolymers can be obtained by way of dispersion or emulsion polymerization techniques, they are advantageously prepared by the much faster high pressure bulk polymerization processes in current use. The starting EVA copolymers herein contain from about 5% to about 95% by weight of combined ethylene, the balance of the polymer being made up of combined vinyl acetate. The copolymers can also contain up to about 20% by weight of a combined third comonomer polymerizable with ethylene and vinyl acetate. Illustrative termonomers are methyl acrylate, methyl methacrylate, ethyl acrylate, ethyl methacrylate, propyl acrylate, propyl methacrylate, butyl acrylate, butyl methacrylate, dimethyl itaconate, diethyl itaconate, dimethyl-2-methylene glutarate, diethyl-2-methylene glutarate, dimethyl maleate, diethyl fumarate, dibutyl fumarate, and the like. In these terpolymers, 5 to 95 percent of the weight of the remainder will comprise vinyl acetate units and 95 to 5 percent ethylene units.

The process of this invention is especially effective with EVA copolymers having a melt index of less than about 40, particularly those having a melt index of less than about 25 and more particularly EVA copolymers having a melt index of less than about 10. Of course, the present process is effective with polymers of higher melt index, e.g., the polymers described in the aforesaid DDR Pat. No. 88,404 having melt index of 100 and higher. Obviously, melt index of the polymer substrate is not a critical consideration as far as the present process is concerned.

In accordance with this invention, EVA copolymer is agitated in the molten state in an aqueous dispersion system and the dispersed copolymer is thereafter saponified with a strong base, generally in stoichiometrical fashion to provide a copolymer having a desired degree of saponification. Upon cooling to below about 100° C., the saponified copolymer will be recovered in a finely divided, particulate form. Included among the EVA copolymer dispersing agents which are useful in accomplishing the dispersing step of the process herein are the dispersing agents disclosed in copending patent application Ser. Nos. 824,873 (now, U.S. Pat. No. 4,151,133); 824,874; 824,875 (now U.S. Pat. No. 4,148,768); 824,934 (now U.S. Pat. No. 4,151,134); 824,936, each filed Aug. 15, 1977 and each of which is incorporated by reference herein. These applications disclose dispersing systems for dispersing polymers without, however, causing any appreciable hydrolysis of the polymer substrate. The EVA copolymer dispersing systems are described as follows:

A. Combination of a Soap of an Alkali Metal Having an Atomic Weight of at Least 23 and a Neutral Salt (Optional for EVA Copolymers Containing 35% or More Vinyl Acetate)

Ser. Nos. 824,873 (now, U.S. Pat. No. 4,151,133) and 824,874 describe dispersing systems for EVA copolymers containing, respectively, from 0 to 15% vinyl acetate by weight, and from 15 to 35% vinyl acetate by weight, which comprise a soap of an alkali metal having an atomic weight of at least 23, i.e., sodium, potassium, rubidium or cesium, together with a water-soluble substantially neutral salt, the soap being optionally formed in situ. Ser. No. 824,936 describes a dispersing system for an EVA copolymer of from 35 to 85% vinyl acetate by weight which employs the aforesaid alkali metal soap and only optionally, a neutral salt.

The term "soap" as used in said applications and as used herein embraces the alkali metal salts of higher carboxylic acids, particularly the well known fatty acids. The acid moiety of the soap can be saturated or unsaturated, and can be composed of a mixture of such acids as are obtained by saponification of natural glyceride fats. Included in the term "higher carboxylic acid" are the so-called dimer acids made by dimerization of polyunsaturated linear fatty acids. The preferred higher carboxylic acid is a straight-chain $C_8$–$C_{22}$ monocarboxylic acid, which can be saturated or can contain an even or odd number of carbon atoms. Examples are caprylic acid, pelargonic acid, capric acid, undecanoic acid, lauric acid, tridecanoic acid, myristic acid, pentadecanoic acid, palmitic acid, margaric acid, stearic acid, nonadecanoic acid, arachidic (arachic) acid, heneicosanoic acid, behenic acid, 10-undecylenic acid, elaidic acid, oleic acid, erucic acid, brassidic acid, linoleic acid, and linolenic acid as well as mixtures of such acids, and dimer acids made by dimerization of polyunsaturated fatty acids, e.g., linolenic acids. Dimer acids are commercially available and contain 75–95% dimer, 4–25% trimer, and from a trace to 3% of monomeric polyunsaturated fatty acid.

Where a preformed soap is introduced, it will be a soap prepared by neutralization of one of the above disclosed acids or mixtures, with one or mixtures of the bases disclosed below or alternatively, commercially available fatty acid salts can be used.

When an in situ soap is employed, the soap is formed by reacting the fatty acid with an alkali metal hydroxide. Alternatively, the corresponding bicarbonate or carbonate can be used. Examples of the alkali metal hydroxides that can be used are sodium hydroxide, potassium hydroxide, lithium hydroxide, rubidium hydroxide and cesium hydroxide; sodium bicarbonate and sodium carbonate; potassium bicarbonate and potassium carbonate; rubidium bicarbonate and rubidium carbonate; and cesium bicarbonate and carbonate can be substituted for the corresponding hydroxides. Mixtures of the said alkali metal compounds can be employed.

The water soluble salt is a substantially neutral salt. For the purpose of this invention, such a salt is defined as one that, at a 1.0 Molar concentration in pure water at 20° C. produces a solution, the pH of which has between 4 and 9. The cation of the salt is derived from an alkali metal or any other metal that does not form insoluble soaps with the above-disclosed acid selected, at the operating temperature of the process, i.e., is inert to the soap employed. The cation can be monovalent, divalent or of a higher valence. The nature of the anion of the salt does not appear to be critical; the anion can be, for example, fluoride, chloride, bromide, iodide, bisulfate, sulfate, phosphate, hydrogen phosphate, dihydrogen phosphate, nitrate, bicarbonate, carbonate, acetate or propionate anion, or similar such anions. Mixtures of salts can be employed.

Specific examples of the water-soluble salts are lithium fluoride, lithium chloride, sodium bisulfate, sodium sulfate, sodium hydrogen phosphate, ammonium chloride, potassium dihydrogen phosphate, sodium carbonate, sodium acetate, sodium propionate, etc. The cation of the soap and the water-soluble salt can be the same or different.

It is usually preferred that the ratio of water to polymer range from about 0.1 to about 5 parts of water per part of polymer on a weight basis. Higher ratios are operable, but uneconomical, whereas lower ratios, though usable, present operational difficulties. The most preferred range is about 4 to about 1.5 parts of water per part of polymer on a weight basis. For in situ soap formation, the mole ratio of base to the amount of fatty acid can vary from about 1.0 to about 1.15, the preferred ratio being from about 1.05 to about 1.1. Lower ratios are operable, but may result in increased tackiness of the polymer due to solution of unneutralized fatty acid therein. Higher ratios of base are to be avoided as it is necessary to preclude any conditions which would result in significant saponification of EVA copolymer in the dispersing step of the process herein. The weight ratio of in situ fatty acid soap to polymer can vary from about 0.01 to about 0.3, the preferred ratio being from about 0.05 to about 0.15. The use of lower ratios of soap does not always result in the desired dispersion of the polymer; higher ratios are generally unnecessary and therefore uneconomical. The preferred higher carboxylic acid is a preferably fatty acid, stearic acid. The preferred base for neutralization is sodium hydroxide.

The concentration of water-soluble salt in water can range from at least about 0.1 and up to about 15 weight percent, the preferred concentration being from about 1.0 to about 10 weight percent. Dispersions are not readily obtained at lower concentrations and higher concentrations are unnecessary. In addition, higher concentrations may tend to cause larger particle size. Thus, there appears to be optimum salt concentration. Sodium chloride, sodium sulfate, and sodium acetate are the preferred water-soluble salts. These salts are preferred because hydrochloric acid, sulfuric acid, or acetic acid respectively, can then be used to convert recovered sodium stearate to stearic acid for recycle, when in situ sodium stearate is employed, while producing the same water-soluble salt used in the dispersion. Halide salts, particularly chlorides, though operable, are not preferred with stainless steel equipment because of the tendency to cause stress-corrosion cracking of the steel. A nickel alloy (Monel) is preferred for chloride service.

B. Lithium Salt of a Higher Saturated Fatty Acid

The dispersing agents of Ser. No. 824,875 which are suitable for use herein are lithium salts (i.e., soaps) of higher saturated fatty acids containing at least about 16 carbon atoms, and preferably from about 18 to 26 carbon atoms. The contemplated fatty acids conform to the formula $C_nH_{2n+1}COOH$ in which "n" is at least 15, and preferably from 17 to about 25, and include linear saturated fatty acids such as behenic, stearic, arachidic, lignoceric, and cerotic acids and mixtures thereof. Of these acids, behenic is preferred.

The amount of water used in relation to the polymer dispersed with the lithium soaps preferably ranges from about 0.33 to 25 parts by weight of water per part of normally solid polymer, most preferably between about 4 and 20 parts per part of polymer. To prepare dispersions which are more dilute, it is usually more economical to dilute a more concentrated dispersion. Dispersions containing more than about 60 percent of polymer are generally quite viscous and difficult to handle. To a limited extent, the dispersion becomes finer as the concentration of polymer increases, other conditions being held constant.

The amount of lithium soap dispersing agent to be used will vary with the amount of resin employed, the desired particle size and other factors, such as the amount of water employed. In general, the amount of dispersing agent should be sufficient to disperse the molten resin under the selected conditions for forming the dispersion. Usually it is preferred to use at least 5 parts of dispersing agent per 100 parts of resin, with the preferred range being from about 5 to about 15 parts per 100 parts of resin. Larger amounts of the dispersing agent show no significant influence on the resultant product and tend to make subsequent removal of the dispersing agent from the polymer more difficult. It is preferred that the amount of lithium soap also be adjusted with respect to the amount of water present so that the amount of soap present is at least about 0.5% by weight based on the water present, and preferably above about 1%. If the amount of soap present based on the water present is below 0.5% by weight, the particles tend to be of larger diameter and the number average particle size is larger than 100 microns.

C. Other EVA Copolymer Dispersing Agents

Other dispersing agents which can be employed herein with good results are the sulfates, sulfonates, sarcosinates, sodium salts of organophosphate esters, fatty amide phosphates, polymeric acrylics, fatty amide derivatives, higher alkyl amines, amido amines, substituted imidazolines, substituted betaines, N-alkyl beta amino acid salts, protein derivatives, polyaminocarboxylic acid salts, cationic polyamines, alkyl amides and ethoxylated alkylol amides. The aforecited dispersing agents generally require the addition of small quantities of strong base, i.e., below the quantity necessary to provide significant saponification of the dispersed polymer in a given period of time, in order to be rendered effective.

Useful organophosphate esters embrace a diversity of partially esterified phosphorus-containing surface active materials including the phosphate mono-and diesters, phosphated fatty glycols of varying chain length, derivatives of alpha-and beta-glycero phosphoric acids and esters, derivatives of sugar phosphates and their esters, derivatives of phosphatidic acids and their esters such as those with fatty acyl groups, derivatives of amino phosphatides and esters thereof and the ethoxylated derivatives of these and similar materials. The hydrophobic moiety of the dispersing agents can be aliphatic, aromatic or both. There are numerous commercially available phosphate esters which in the form of their alkali metal salts, especially those of sodium and potassium with sodium being preferred, can be advantageously used herein. Among such phosphate esters are included Triton QS-44 (Rohm & Haas Co.), phosphate esters in free acid form; Consolevel HT (Consos, Inc.), phosphated fatty glycol; Wayfos A and Wayfos TD60 (Philip A. Hunt Chemical Corp.), complex organic (aliphatic) phosphate esters, and Wayfos D10N and Wayfos M10N, complex organic (aromatic) phosphate esters; Crodafos SG, Crodafos N-3 Acid and Crodafos N-10 Acid (Croda, Inc.), phosphated cetyl and olelyl ethers; and, Maphos 8078 and Maphos 8135 (Mazer Chemicals), complex organic phosphate esters.

Examples of other EVA copolymer dispersing agents which can be employed herein are Deriphat 151, Deriphat 154 and Deriphat 160 (General Mills Chemicals, Inc.), respectively, the sodium salt of N-coco beta amino propionate, the disodium salt of N-tallow beta amino dipropionate and the disodium salt of N-lauryl beta iminodipropionate; Mafo 13 and Mafo 213 (Mazer Chemicals), respectively, the potassium salt of complex N-stearyl amino acid and the dipotassium salt of complex N-stearyl amino dicarboxylic acid; Armeen Z (Armak Co.), an N-cocoamino butyric acid; Lipoproteol UCO and Lipoproteol LCO (Rhodia, Inc.), both of which are salts of lipoaminoacids; Obanol 512 (Toho Chemical Industry), a dodecyl polyaminoethyl glycine; Nutrilan (Chemical Fabrik Grunau GmbH), a sodium salt of a polypeptide; Amphoterge K, Amphoterge SB and Amphoterge K-2 (Lonza, Inc.), a series of substituted imidazolines; Miranol DM (Miranol Chemical Co., Inc.), a dicarboxylic stearic imidazolinium derivative; the Monaterics (Mona Industries), a series of coconut amphoterics and substituted imidazoline salts; Igepon CN-42 (GAF Corp. Chemical Products), a sodium N-cyclohexyl-N-palmitoyltaurate and Sarcosine O (Ciba Geigy), N-oleoylsarcosine C (as a sodium salt).

The amount of water used in relation to the EVA copolymer dispersed generally ranges from about 0.1 to about 10 parts by weight of water per part of normally solid polymer. Higher ratios are operable but uneconomical whereas lower ratios, although usable, present operational difficulties. The preferred range is between about 0.2 and about 5 parts per part of polymer.

The amount of dispersing agent, together with hydrotropic agent if needed, should be sufficient to provide a dispersion of the resin in the water under the selected conditions. Very good dispersions can be obtained at amounts within the range of from 2 to about 25 weight parts dispersing agent per 100 weight parts of resin and as such, these amounts are preferred. There is no upper limit on the amount of dispersing agent which can be employed except that exceeding the amount beyond that required to provide an acceptable dispersion may be economically wasteful.

If desired, small quantities of a base such as sodium hydroxide can be included in the dispersion of EVA copolymer to regulate the particle size distribution, provided, however, that either the amount of base which is included in the dispersion step and/or the dispersing temperature and/or the holding period for the hot dispersion is such that no appreciable amount of saponification takes place. The particle size-adjusting amount of base to be employed for a given EVA copolymer can be readily determined by simple and routine experimentation. Even as small an amount as about 0.6 weight parts per 100 weight parts of resin will decrease the particle size. There also exists an optimum amount of base for minimum particle size, i.e., larger amounts of base added to the dispersion will again increase the particle size. The amount, of course, will vary with different dispersing agents.

THE DISPERSING STEP

The temperature for forming the hot aqueous EVA copolymer dispersion can range from about 100° C. to about 350° C. with temperatures of from about 150° C. to about 250° C. being preferred. Dispersions are usually not readily obtainable at lower temperatures and higher temperatures are usually not required for successful dispersion. The pressure is autogenous. The rate of stirring should vary from about 2600 to about 4000 rpm with from about 1200 to about 3800 rpm being preferred, although stirring rates that are lower are at times sufficient. Higher stirring rates can be employed but usually are not advantageous. The dispersion times can range from about 1 minute to about 1 hour; times of about 5 to 15 minutes are preferred.

The dispersing step can be carried out in the presence of a saponifying amount of a strong base provided, as noted above, either the holding period and/or the dispersing temperature for the hot dispersion is such that no appreciable amount of saponification can take place. Accordingly, it is within the scope of this invention to add the saponification agent to the media of the dispersing step either before or during the formation of the dispersion and to carry out said step for a period of time and/or at such a temperature that very little saponification will take place and thereafter to conduct the saponifying step at conditions of time and/or temperature which are conducive to effective saponification. This embodiment of the invention may be conveniently referred to as a "two-stage" process distinguished from the other embodiment (the "two-step" process) in which the saponification agent is only added to the dispersed EVA copolymer at the commencement of the saponifying step.

THE SAPONIFYING STEP

Following obtaining the EVA copolymer in dispersed form in accordance with the procedure described above, the dispersed resin is saponified using a strong base as the saponification agent to provide the desired degree of saponification. As described above, the saponification agent can be added before or during the saponifying step or at the commencement of the saponifying step. The saponification reaction generally proceeds stoichiometrically. The expression "strong base" as employed herein refers to alkali metal hydroxides, e.g., sodium hydroxide and potassium hydroxide, and salts of alkali metals which in a 1.0 molar solution, exhibit a pH of about 11.0 or higher, e.g., trisodium phosphate. Sodium hydroxide is especially preferred. Saponification temperatures can range from about 175° C. to about 300° C. but temperatures from about 175° to about 225° C. are preferred. The saponifying step can be effected immediately after the EVA copolymer dispersion has been formed but more commonly will be carried out after the dispersion has been permitted to cool somewhat, e.g., to about 100° C., since the addition of alkali metal hydroxide to the aqueous dispersion medium can generate a considerable amount of heat which might otherwise be difficult to deal with in dispersion media at their peak temperatures. The rate of stirring for the saponifying step can be the same or lower than the stirring rate employed in the dispersing step. Generally, rates of about 18 to 1,900 ft./min. blade tip speed provide acceptable results. Saponification times can range from about 1 minute to about 90 minutes depending on the type of EVA copolymer involved as well as the degree of saponification desired. Upon cooling to below about 100° C., the saponified copolymer will be recoverable in a finely divided particulate form.

Recovery of the saponified EVA copolymer particles can be accomplished employing any one of several known and conventional techniques such as filtration or centrifugation.

The dispersions of the HEVA polymer substrate produced in accordance with the present invention are generally composed of particles, usually spherical, of an average diameter ranging from about 20 microns up to about 500 microns, with the majority of particles usually being less than about 250 microns. With the preferred systems, a substantial majority of the particles are less than 150 microns, usually ranging from about 20 to about 150 microns with most of the particles being in the range of about 50 to about 100 microns. If desired, the process can be carried out in such a manner as to produce HEVA substantially spherical particles. However, such sphericity is not always necessary or advantageous for some product end-uses.

The following examples are illustrative of the sequential dispersion-saponification process of this invention (in which all percentages are by weight).

EXAMPLE I 150 g of an EVA copolymer containing 27.68% vinyl acetate with a MFR (ASTM D1238, Condition E) of 2.2 g/10 min. in the form of pellets, 30 g of sodium stearate, and 450 ml deionized water were charged to a reactor. Heat was applied until the temperature of the mixture reached 200° C. at a pressure of 235 psi. Stirring was then started at a rate of 3700 rpm and continued during the cooling period which started immediately after the temperature had reached 200° C. and lasted about 15 minutes until the temperature had dropped below 100° C. The residual pressure was then bled off, and the reactor was opened. The polymer was dispersed. To this dispersion were added 23.0 g of sodium hydroxide in pellet form. The reactor was sealed and heat applied. When the temperature had reached approximately 100° C., stirring at a rate of 2400 rpm was applied and continued during the heat-up to 200° C., during the residence time at 200° C. as well as during the cooling stage. The residence time for this polymer was 60 minutes. After this period the reaction mixture was cooled below 100° C., the reactor opened and the polymer discharged. The mother liquor was separated by filtration and the copolymer filter cake was thoroughly washed with hot water and dried. The dried material had a residual vinyl acetate content of 1.1% and was made up of fine white particles.

The same procedure was used to fully saponify two additional EVA copolymers. The details and results of these procedures and the above-described process are summarized in Table I. The same three ethylene vinyl acetate copolymers were then subjected to a half saponification, i.e., half of the available acetate groups were hydrolyzed thus requiring half the amount of sodium hydroxide and less time than the full saponification. The same procedure as described above was used except for the shorter residence times. Details and results are summarized in Table II.

TABLE I

Charge: Water: 450 ml; EVA Copolymer: 150 g; Sodium Stearate: 30 g; Sodium Hydroxide: as indicated

| EVA Copolymer | | NaOH | Residence | Product | | | |
|---|---|---|---|---|---|---|---|
| | | | | | Residual | | |
| | Amt. | Amt. | Time | Yield | Vinyl- | Appearance of | |
| Type | g | g | min. | % | Acetate % | Dispersion | |
| UE-634[1] | 150 | 23.0 | 60 | 100 | 1.10 | Very fine dispersion | |
| EY-901[2] | 150 | 35.0 | 15 | 100 | 1.16 | Very fine dispersion | |
| EY-907[3] | 150 | 46.0 | 30 | 100 | 0.17 | Very fine dispersion | |

[1]U.S. Industrial Chemicals Co. EVA copolymer containing 27.68% vinyl acetate with a MFR(ASTM D1238-65T, Condition E) of 2.2 g/10 min

[2]U.S. Industrial Chemicals Co. EVA copolymer containing 39.97% vinyl acetate with a MFR(ASTM D1238-65T, Condition E) of 7.4 g/10 min.

[3]U.S. Industrial Chemicals Co. EVA copolymer containing 59.81% vinyl acetate with a MFR(ASTM D1238-65T, Condition E) of 0.4 -/10 min.

TABLE II

Charge: Water: 450 ml; EVA Copolymer: 150 g; Sodium Stearate: 30 g; Sodium Hydroxide: as indicated; Temperature: 200° C.

| EVA Copolymer | | NaOH | Product | | |
|---|---|---|---|---|---|
| | | | | Residual | |
| | Amt. | Amt. | Yield | Vinyl | Appearance of |
| Type | g | g | % | Acetate % | Dispersion |
| UE-634[4] | 150 | 11.5 | 100 | 12.42 | Microscopic and Submicron particles |
| EY-901[5] | 150 | 16.3 | 100 | 12.42 | Very small chips |
| EY-907[6] | 150 | 23.0 | 100 | 35.33 | Small chips |

[4]U.S. Industrial Chemicals Co. EVA copolymer containing 27.68% vinyl acetate with a MFR (ASTM D1238-65T, Condition E) of 2.2 g/10 min.

[5]U.S. Industrial Chemicals Co. EVA copolymer containing 42.52% vinyl acetate with a MFR (ASTM D1238-65T, Condition B) of 1.1 g/10 min.

[6]U.S. Industrial Chemicals Co. EVA copolymer containing 59.81% vinyl acetate with a MFR (ASTM D1238-65T, Condition E) of 0.4 g/10 min.

EXAMPLE II

In two sets of runs the benefits of a two-stage and a two-step saponification process were demonstrated. In the first set of runs, EVA copolymers, water, sodium stearate and sodium hydroxide (see Table III) were charged to the reactor and heated to stage I temperature at which the mixture was kept for 7 minutes under stirring. Under these conditions of temperature and time only negligible saponification could occur. After this period, the mixture of dispersed resin was brought up to the temperature of stage II (B and C in Talbe III) and held there for 20 minutes to allow for saponification. At the end of the retention time (stage II), the mixture was rapidly cooled. The resulting dispersion clearly demonstrates that dispersion at a temperature at which relatively little saponification occurs with subsequent saponification at a higher temperature favors small particle size distribution.

In another set of runs, simultaneous dispersion/saponification in accordance with a known procedure was compared to dispersions of the copolymer without the presence of sodium hydroxide and subsequent saponification after the addition of sodium hydroxide (Table IV). The technique used for the simultaneous dispersion/saponification was essentially the one described above except that stage I and II proceeded at the same temperature. The procedure used for the two-step saponification was the same as that described in Example I. Table IV shows the results which clearly demonstrate the benefit of the two-step process.

TABLE III

Charge: Water: 450 ml; EVA Copolymer:[7] 150 g; Sodium Stearate: 15.0 g; Sodium Hydroxide: 15.3 g; Dispersion Time (Stage I): 7 min; Retention Time (State II): 20 min

| | Stage I | Stage II | Dispersed Product | | | | |
|---|---|---|---|---|---|---|---|
| | | | Residual | Screen Analysis, Wt.%, Microns | | | |
| | Temp. °C. | Temp. °C. | Vinyl Acetate ° | 25% below | 50% below | 75% below | 100% below |
| A | 230 | 230 | 20.8 | 380 | 680 | 1,280 | 2,500 |
| B | 190 | 190-200 | 21.7 | 310 | 480 | 850 | 2,000 |
| C | 170 | 200 | 21.4 | 180 | 240 | 250 | 420 |

[7]U.S. Industrial Chemicals Co. EVA copolymer containing 42.7% vinyl acetate having a MFRASTM D1238-65T, Condition B) of 1.6 g/10 min.

TABLE IV

Charge: 150 g EY-901[8]
450 ml water
22.5 g sodium stearate
32.6 g NaOH[9]

| | Process | | Product | | | | | |
|---|---|---|---|---|---|---|---|---|
| Type Process | Retention Time min. | Saponification Temp. °C. | Residual Vinyl Acetate % | Percent Dispersed | Weight Percent of Particles having Diameters (Microns) of: <75 | 75-106 | 106-149 | >149 |
| Simultaneous Dispersion/ Saponification | 30 | 200 | .50 | 100 | 5.1 | 2.6 | 5.1 | 87.2 |
| Two-step | 30 | 200 | .67 | 100 | 84.3 | 4.7 | 2.8 | 8.2 |

[8]U.S. Industrial Chemicals Co. EVA copolymer containing 42.52% vinyl acetate with a MFR (ASTM D1238-65T, Condition B) of 1.1 g/10 min.
[9]In the two-step process, the sodium hydroxide was added only after the copolymer had been dispersed.

EXAMPLE III

In another set of runs (summarized in Talbe V), the use of different types of dispersing agents in the two-step saponification process is demonstrated for three EVA copolymers of different vinyl acetate contents. The procedure used for these runs was the same as that described in Example I except that the EVA copolymer EY-907 was saponified at 175 C.

TABLE V

Charge: 150 g EVA copolymer as indicated
450 ml water (adjusted when dispersing agent contained large amounts of water)
22.5 g surfactant (based on 100%)
Sodium hydroxide as indicated
Temperature: 200° C.

| | PRODUCT | | | | | |
|---|---|---|---|---|---|---|
| Dispersing Agent | Appearance of Saponified UE 634[17] | Residual V.A. Wt. % | Appearance of Saponified EY-901[18] | Residual V.A. Wt. % | Appearance of Saponified EV-907[19] | Residual V.A. Wt. % |
| Sodium Stearate | Very loosely agglomerated fine particles | 1.65 | Sl. agglomerated fine particles | 3.53 | Very slightly agglomerated chips | .88 |
| Igepon CN-42[10] | Very loosely agglomerated fine particles | 1.45 | Sl. agglomerated small chips | 3.05 | Agglomerated small chips | 1.00 |
| Triton X-301[11] | Partially agglomerated large chips | 3.79 | No dispersion; agglomerated mass | 2.19 | No dispersion; agglomerated mass | 1.17 |
| Triton QS-44[12] | Very fine dispersion | 3.46 | Fine dispersion | 3.95 | Agglomerated fine needles | 5.63 |
| Hallcomid M-18[13] | No dispersion; agglomerated mass | 1.80 | No dispersion; agglomerated mass | 4.65 | No dispersion; agglomerated mass | 2.77 |
| Miranol C2M[14] | Small chips | 4.62 | Fused chips | 5.05 | No dispersion agglomerated mass | 3.64 |
| Schercozoline B[15] | Fine particles | 2.10 | Large chips | 2.46 | No dispersion; agglomerated mass | 1.61 |
| Ceramine HCA[16] | Slightly agglomerated small chips | 2.50 | No dispersion; agglomerated mass | 1.20 | No dispersion; agglomerated mass | 1.84 |

[10]Sodium N-cyclohexyl - N palmitoyl taurate (GAF Corp. Chemical Products)
[11]Sodium alkyl aryl polyether sulfate (Rohm & Haas Co.)
[12]Sodium salt of phosphate ester (Rohm & Haas Co.)
[13]N,N-dimethyl stearamide (The C. P. Hall Co.)
[14]Substituted imidazoline (Miranol Chemical Co., Inc.)
[15]Substituted imidazoline (Scher Chemicals Inc.)
[16]Fatty amide derivative (Sandez Colors and Chemicals)
[17]UZ-634, U.S. Industrial Chemicals Co. EVA copolymer of 28% V.A. required, 15.33 parts NaOH/100 parts polymer and 60 minutes for saponification
[18]EY-901, U.S. Industrial Chemicals Co. EVA copolymer of 40% V.A. required, 20.47 parts NaOH/100 parts polymer and 30 minutes for saponification
[19]EY-907, U.S. Industrial Chemicals Co. EVA copolymer of 60% V.A. required, 28.67 parts NaOH/100 parts polymer and 15 minutes for saponification

EXAMPLE IV

This example demonstrates that the amount of dispersing agent in the two-step dispersion/saponification process of this invention will influence the particle size distribution, i.e., relatively low amounts of dispersing agent in a reaction requiring large amounts of sodium hydroxide will result in large particles and poor dispersions. In each run a slurry was prepared by dispersing the ethylene vinyl acetate copolymer in water using sodium stearate as the dispersing agent. All slurries prepared were good dispersions of fine particle size. In each case, the slurry and the sodium hydroxide were charged to the reactor which was sealed and then heated to 175° C. After the temperature had reached 100° C., stirring was applied at 18,800 ft/min tip speed. When the temperature had reached 175° C. the mixture was kept at this temperature for 15 minutes. After this period, the reaction mixture was cooled to below 100° C., the reactor opened and the polymer discharged. The mother liquor was separated by filtration. The copolymer filter cake was thoroughly washed with hot water and dried. The appearance of the material, the residual vinyl acetate content and other details of the procedure are summarized in Table VI. Although the extent of saponification was essentially the same in all runs, the appearance of the saponified product varied widely demonstrating that minimum amounts of dispersing agent must be used for dispersion/saponifications which require relatively large amounts of caustic to insure small particle size dispersions.

TABLE VI

Slurry: 1500 ml. water[20]
750 g. dispersed polymer[21]
Dispersing agent as indicated

| | Dispersing Agent | | | Saponified Product | | |
|---|---|---|---|---|---|---|
| | Type | Amt. p.p.h. | NaOH g. | Yield % | Residual Vinyl Acetate % | Extent of Dispersion |
| A | Sodium Stearate | 7.5 | 230 | 50 | 0.22 | Large, irregular chunks |
| B | Sodium Stearate | 10.0 | 230 | 100 | 0.55 | Large chips |
| C | Sodium Stearate | 12.5 | 230 | 100 | 0.38 | Microscopic to macroscopic spheroids |

[20]Run C contained 1,800 ml. water
[21]U.S. Industrial Chemicals Co. EVA copolymer containing 59.81% vinyl acetate with a MFR (ASTM D1238, Condition E) of 0.4 g/10 min.

What is claimed is:

1. A process for obtaining finely divided saponified ethylene-vinyl acetate copolymer particles which comprises the sequential steps of:

(a) dispersing the copolymer in an aqueous dispersion medium containing a dispersing agent for EVA copolymer under such conditions of time and/or temperature that no appreciable saponification of the dispersed copolymer can occur, the resulting dispersion being made up of particles of an average diameter of from about 20 to about 500 microns; and, (b) saponifying the dispersed copolymer employing a strong base as the saponifying agent under such conditions of time and/or temperature that saponification to a predetermined extent is achieved.

2. The process of claim 1 wherein the ethylene-vinyl acetate copolymer contains up to about 15% by weight of combined vinyl acetate.

3. The process of claim 1 wherein the ethylene-vinyl acetate copolymer contains from above about 15% up to about 35% by weight of combined vinyl acetate.

4. The process of claim 1 wherein the ethylene-vinyl acetate copolymer contains above about 35% by weight of combined vinyl acetate.

5. The process of claim 2 wherein the dispersing agent is a combination of a soap of an alkali metal having an atomic weight of at least 23 and a water-soluble substantially neutral salt.

6. The process of claim 3 wherein the dispersing agent is a combination of a soap of an alkali metal having an atomic weight of at least 23 and a water-soluble substantially neutral salt.

7. The process of claim 4 wherein the dispersing agent is a soap of an alkali metal having an atomic weight of at least 23.

8. The process of claim 5 wherein the soap is sodium stearate and the salt is sodium chloride.

9. The process of claim 6 wherein the soap is sodium stearate and the salt is sodium chloride.

10. The process of claim 7 wherein the soap is sodium stearate.

11. The process of claim 1 wherein the dispersing agent is a lithium soap of a higher saturated fatty acid.

12. The process of claim 11 wherein the soap is lithium behenate.

13. The process of claim 1 wherein the dispersing agent is selected from the group of surface active agents consisting of the sulfates, sulfonates, sarcosinates, and sodium salts of organophosphate esters, fatty amide phosphates, polymeric acrylates, fatty amide derivatives, higher alkyl amines, amido amines, substituted imidazolines, substituted betaines, N-alkyl beta amino acid salts, protein derivatives, polyaminocarboxylic acid salts, cationic polyamines, alkyl amides and ethoxylated alkylol amides.

14. The process of claim 1 wherein the saponifying agent is present during the dispersing step.

15. The process of claim 14 wherein the saponifying agent is sodium hydroxide.

16. The process of claim 1 wherein the saponifying agent is added to the dispersed copolymer at the commencement of the saponifying step.

17. The process of claim 1 wherein the saponified copolymer particles are recovered from the aqueous dispersion medium.

* * * * *